United States Patent
Middler

(10) Patent No.: US 9,993,752 B2
(45) Date of Patent: Jun. 12, 2018

(54) FILTERING DEVICE FOR HIGH-VISCOUS FLUIDS

(71) Applicant: Nordson PPS GmbH, Münster (DE)

(72) Inventor: Robert Middler, Havixbeck (DE)

(73) Assignee: Nordson Corporation, Westlake, OH (US)

( * ) Notice: Subject to any disclaimer, the term of this patent is extended or adjusted under 35 U.S.C. 154(b) by 94 days.

(21) Appl. No.: 15/138,219

(22) Filed: Apr. 26, 2016

(65) Prior Publication Data

US 2016/0317954 A1    Nov. 3, 2016

(30) Foreign Application Priority Data

Apr. 29, 2015  (EP) .................................... 15165817

(51) Int. Cl.
*B01D 29/68*    (2006.01)
*B29C 47/08*    (2006.01)
*B29C 47/68*    (2006.01)

(52) U.S. Cl.
CPC .......... *B01D 29/68* (2013.01); *B29C 47/0886* (2013.01); *B29C 47/681* (2013.01); *B29C 47/682* (2013.01)

(58) Field of Classification Search
None
See application file for complete search history.

(56) References Cited

U.S. PATENT DOCUMENTS

| 6,290,846 B1 * | 9/2001 | Hangmann ............ B01D 29/05 210/236 |
| 8,153,012 B2 | 4/2012 | Woestmann et al. |
| 2014/0332460 A1 | 11/2014 | Woestmann |

FOREIGN PATENT DOCUMENTS

| CN | 203805274 U | 9/2014 |
| DE | 102005043096 A1 | 3/2007 |
| DE | 102011001262 | 9/2012 |
| EP | 0554237 A1 | 8/1993 |
| EP | 1762364 A2 | 3/2007 |
| EP | 1778379 A1 | 5/2007 |
| WO | 2013182192 A1 | 12/2013 |

OTHER PUBLICATIONS

European Application No. 15165817.6: Extended European Search Report dated Oct. 23, 2015, 7 pages.

* cited by examiner

*Primary Examiner* — Chester T Barry
(74) *Attorney, Agent, or Firm* — Baker & Hosteter, LLP

(57) ABSTRACT

A filtering device for high-viscous fluids having a two pistons being movably disposed in bores is disclosed. Each piston has at least one cavity and at least one filter element. The device also includes a displacing piston for generating fluid pressure and reversing the flow direction at the fluid during a back-flushing mode in an outlet channel or in a reservoir connected therewith.

9 Claims, 14 Drawing Sheets

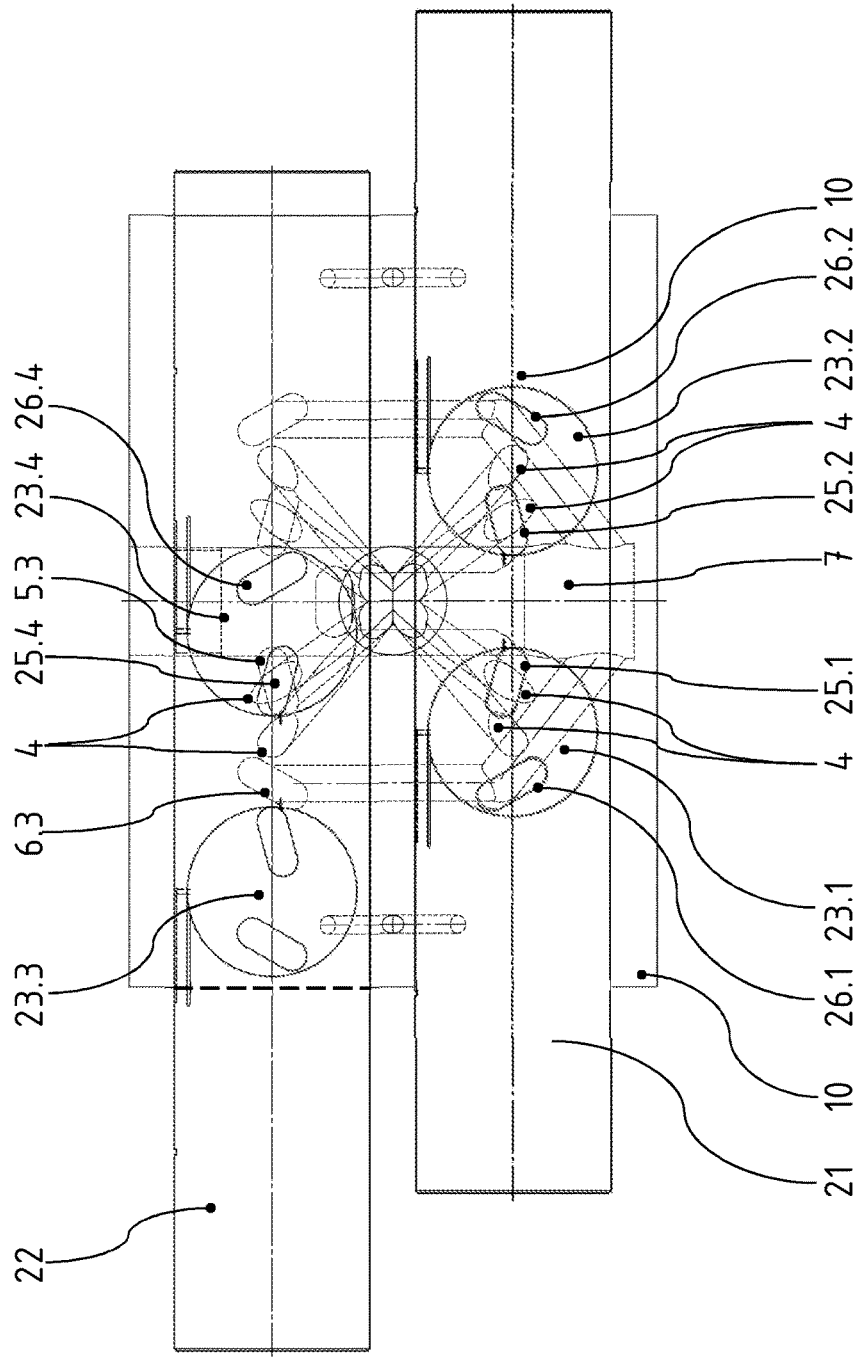

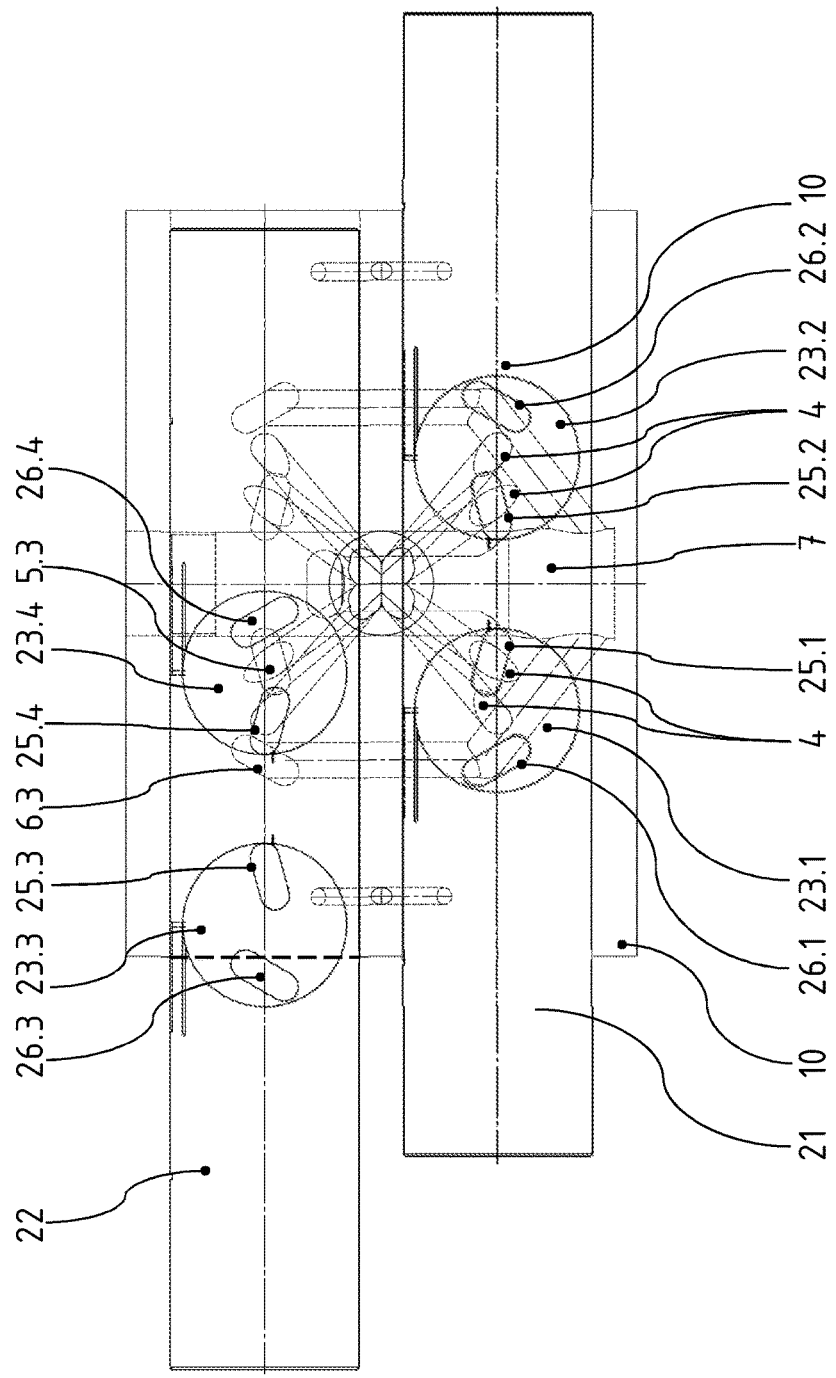

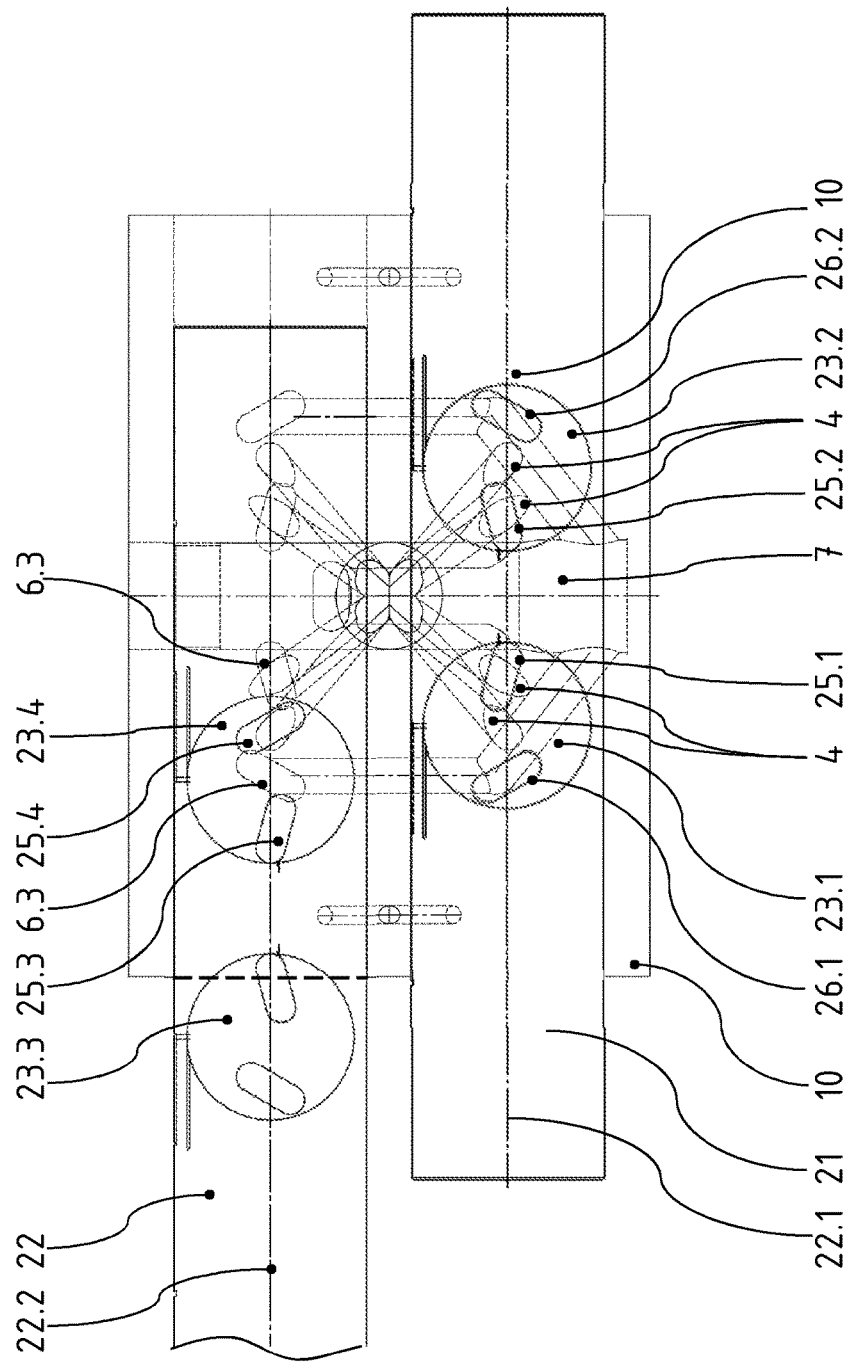

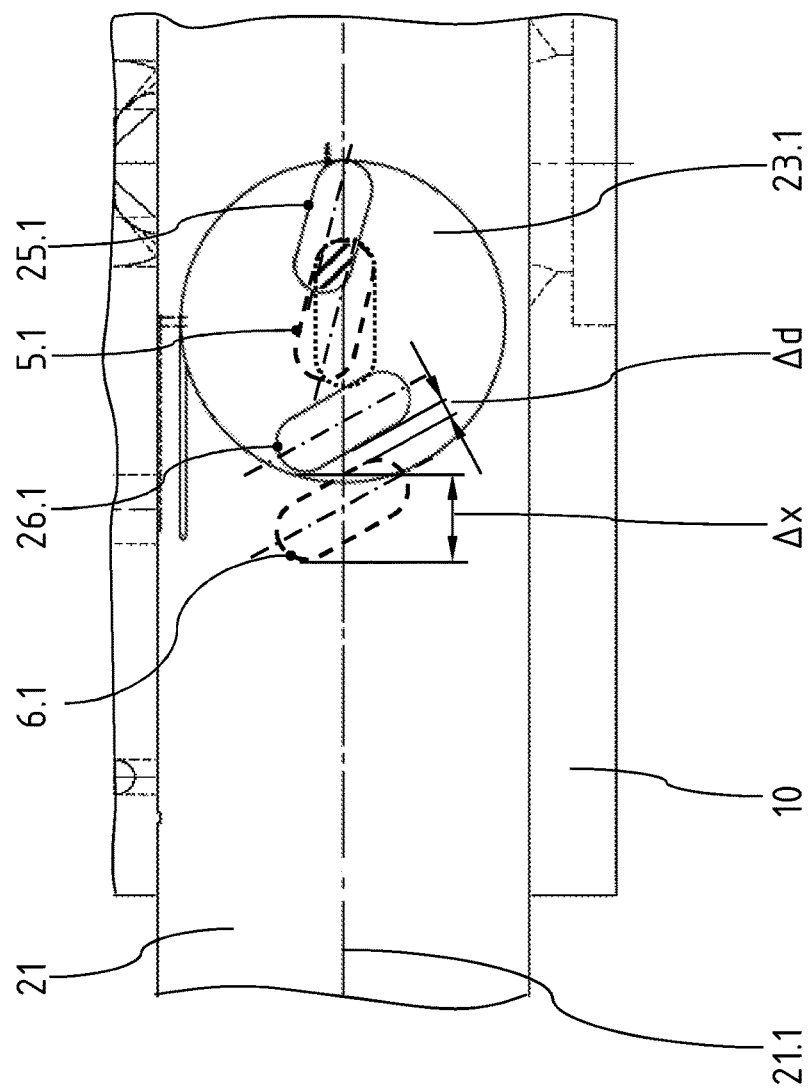

FILTERING DEVICE FOR HIGH-VISCOUS FLUIDS

CROSS-REFERENCE TO RELATED APPLICATIONS

This application claims priority to European Patent App. No. EP 15165817.6, filed Apr. 29, 2015, the disclosure of which is incorporated by reference in its entirety.

FIELD OF THE INVENTION

The invention relates to a screen changer or a filtering device for high-viscous fluids, having a production mode and a back-flush mode, with the features described in the preamble of claim 1. Such filtering devices are used, in particular, to clean molten thermoplastic fluid from impurities and agglomerations which can disturb subsequent production stages in plastic processing.

BACKGROUND

Filtering devices—called piston type screen changers are known for filtering high-viscosity media such as plastic melts. The filtering device has a housing and feed channels. Two pistons are arranged movably in the housing. Each of these pistons has at least one cavity. At least one filter element or screen is placed in each cavity. In the production mode of operation, the feed channels in the housing branch off towards the cavities in such a way that melt is guided through the respective filter elements. Provided behind the filter element, when viewed in the direction of flow, are partial channels through which the plastic melt is discharged. The partial channels are combined at some point in the housing.

The filtering device with two pistons bearing the filter elements or screens and being movable in a direction basically perpendicular to the flow-through direction of the fluid has several advantages. One of these is that the piston is not only a filter carrier but closes and opens flow paths with its movement so that no additional valves are needed. By a suitable design of flow channels the piston can be moved from a production mode of operation into a back-flushing mode of operation. In the back-flushing mode of operation the fluid is led from the outlet side in a reverse flow direction to the screen, in order to detach impurities stuck to the screen and to flush them out of the housing. Furthermore the piston can be partially moved out of the housing in order to give access to a filter element when cleaning or replacement thereof has become necessary. The screen on the other piston is not adversely affected by the back-flushing process. Thus the filtering device remains operational with at least 50% of the screens.

DE 10 2005 043 096 A1 discloses a filtering device having two piston. Each piston has two filter cavities. While the screen in one cavity is cleaned by back-flushing or is replaced, not only the screens on the other pistons but also the second screen on the same piston remains operational whereby 75% of the total screen area in the filtering device is still used during cleaning or replacement of one screen.

EP 554 237 A1 discloses a filtering device with two pistons, each piston having at least one cavity. Each cavity having a filter element or screen which can be back-flushed by means of an external unit having a collective reservoir and a hydraulically driven single displacing piston disposed therein. By retracting the displacing piston fluid is collected in the reservoir. By pushing the piston forward the pressure in all downstream flow channels is increased in order to improve the cleaning effect during back-flushing. The drawback of this device is that the increased fluid pressure does not only effect the screens in the cavities of the pistons but also effects other equipment in the other direction of the flow channel such as an extrusion die which might be adversely affected by the increased fluid pressure.

In EP 1778 379 B1 an improved filtering device is disclosed having an additional displacing piston for each screen cavity which is used for back-flushing. The displacing piston is inserted into a partial outlet channel which leads to one cavity. The displacing piston presses clean fluid, in reverse flow, from the backside through the screen. The effective pressure results from the force of the displacing piston thus being independent from the fluid pressure in the system.

DE 10 2011 001 262 A1 shows a further improvement of such a filtering device. The displacing piston has an internal channel which, in the production mode, is part of the partial outlet channel extending from an inlet opening in the front face of the displacing piston to an outlet opening at the side wall. Once the displacing piston is retracted the flow path is interrupted and simultaneously located in front of the piston, a reservoir with a larger diameter, is filled with fluid coming through the screen. For back-flushing the displacing piston is moved forward in order to push out the fluid portion stored in the reservoir in a reverse flow direction through the screen.

The known filtering devices with a separate displacing piston per cavity achieve very good cleaning results without adverse impact on the filtering process, which is still going on through the remaining cavities. However, having many displacing piston units results in high complexity of both mechanical as well as electrical design.

The problem addressed by the present invention is to improve a filtering device of the aforementioned kind.

SUMMARY OF THE INVENTION

This problem is solved by a filtering device having a displacing piston for boosting fluid pressure in the back-flushing mode in such a manner that a pressure boost is achieved for each screen or filter element to be cleaned.

The filtering device of the invention requires only one displacing piston as a pressure generator instead of two in a two-cavity filtering device or four in a four cavity filtering device. In comparison with the prior art the filtering device of the present invention is much more compact and less complex. Relating to the four-cavity embodiment, not only are three hydraulic pistons saved but also the wiring, electrical control units, sensors, tubing and pressure pumps needed to drive the hydraulic pistons are saved. This results in a reduction of the weight of the filtering device by about 20% in comparison to a device built in accordance with DE 10 2011 001 262 A1.

In the prior art, hydraulic pistons had to be arranged on the outside of the housing resulting in a large amount of space being used for positioning the filtering device in a plastics production line. In the present invention, the hydraulic piston is either integrated into a supplementary housing or requires only a minor enlargement of the basic housing for integration so there are no protruding units.

In spite of the savings to be achieved in weight and space for the filtering device of the present invention as well as the reduced costs of manufacturing the performance of the filtering device is not derogated.

Below, the invention is explained in greater detail with a view to an advantageous embodiment. The accompanying drawing shows the filtering device in the form of a sectional view, without any hashing but with hidden lines only in order to clearly present the complex arrangement of the inner flow channels arranged inside the housing and partially extending through different planes.

BRIEF DESCRIPTION OF THE DRAWINGS

The figures of the drawing show:

FIG. 9A-9C illustrate the filtering device in different intermediate positions of the upper piston, each in a vertical sectional view;

FIG. 10 illustrates an enlarged detail of FIG. 6; and

DETAILED DESCRIPTION

Figure 1:
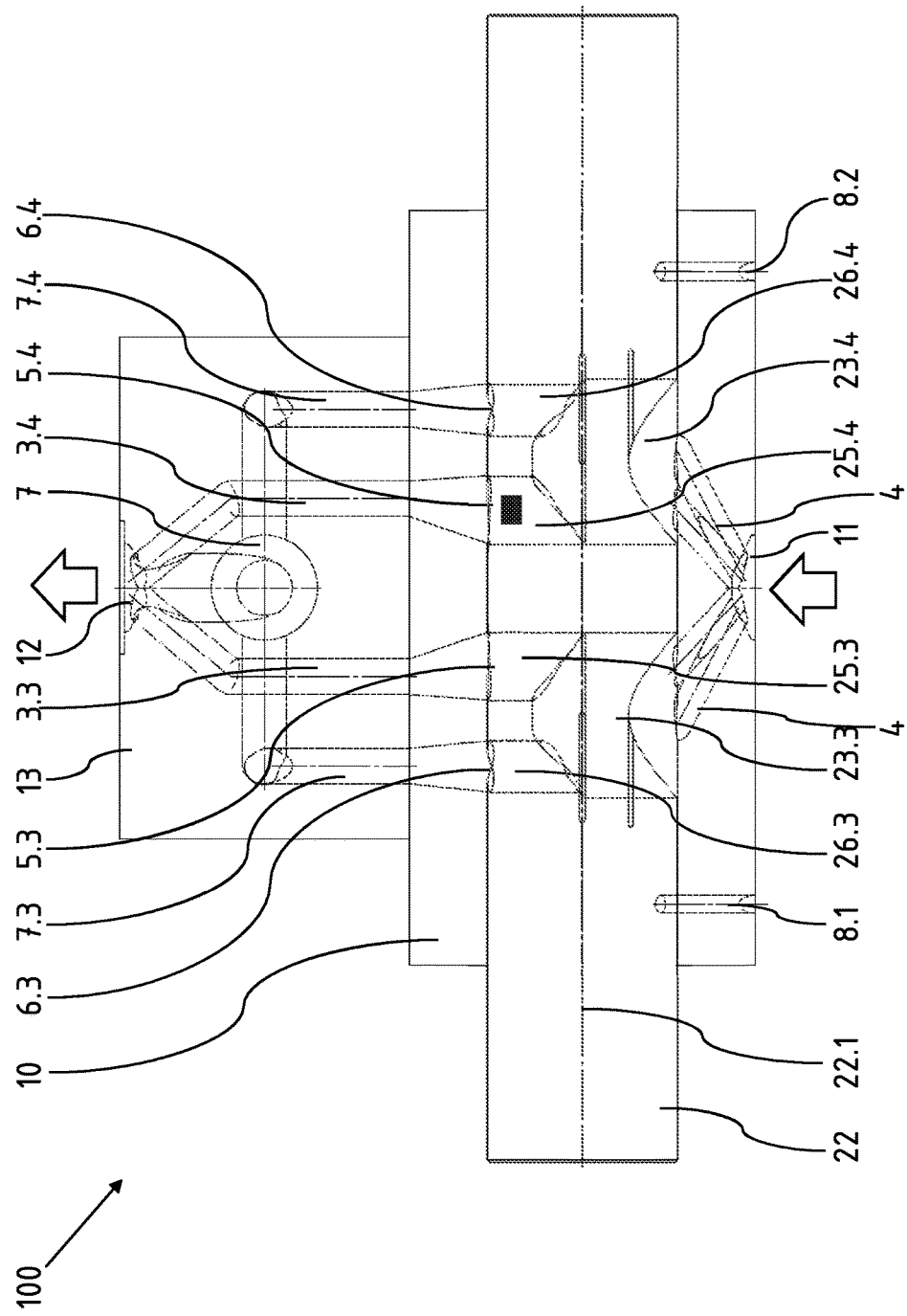
FIG. 1 illustrates a filtering device in the production mode in a horizontal view.

FIG. 1 shows a filtering device 100 comprising a housing 10 and two pistons of which a first piston 22 can be seen in the sectional view through the housing. In the view according to FIG. 1 the second piston 21 is hidden under the piston 22. In FIG. 1 as well as in the following sectional views the piston itself is not shown in section.

The flow direction through the filtering device 100 is illustrated by the arrows. Fluid enters the housing at an inlet opening 11, which connects to different partial inlet channels 4. The piston 22, in the preferred embodiment, has two cavities 23.3 and 23.4. However, the piston 22 may have one or more than two cavities.

One pair of inlet channels 4 leads to each cavity 23.3, 23.4 in the piston 22. On the inlet side at which the fluid enters into the filtering device additional back-flushing channels 8.1, 8.2 are installed. The back-flushing channels are separated from the inlet opening 11 and from the inlet channels 4 and do not have contact with the cavities 23.3, 23.4 during the production mode which is shown in FIG. 1.

In each of the cavities 23.3, 23.4 at least one screen or filter element is placed in order to retain any contaminants contained in the fluid coming from the inlet side of the screen, which is also designated as the dirty side. The screens are fastened and secured against pressure in reverse flow direction by screen retainer elements. There are also grooves on the top of piston 22, which are necessary for venting and refilling cavities after screen replacement. All these elements are not shown in FIG. 1 as they are well known in the prior art.

On the outlet side, also known as the clean side, the piston 22 has in total four outlet openings 25.3, 26.3, 25.4, 26.4. Two of the outlet openings are behind each screen cavity 23.3, 23.4. In the production mode, the outlet openings 25.3, 25.4, 26.3, 26.4 match with partial outlet channel openings 5.3, 5.4, 6.3, 6.4 in the housing 10.

As far as described above, the filtering device 100 still corresponds to the basic design of such filtering devices known from the prior art.

The improvement of the invention is having the supplementary housing unit 13 incorporating a single pressure generator in form of a displacing piston 16 and by having a differentiation between two groups of outlet channels. The supplementary housing unit 13 can be made as an integral part of the housing 10 or as a separate unit detachably mounted to the housing 10.

One group of outlet channels is designated as direct outlet channels 3.3, 3.4. In the production mode their openings 5.3, 5.4 are in flow communication with the direct outlet openings 25.3, 25.4 on the backside of the piston 22. The direct outlet channels 3.3, 3.4 are directly connected with an outlet opening 12 on the supplementary housing 13 without any interruption.

In the production mode, the second group of outlet channels is designated as indirect outlet channels 7.3, 7.4. The openings 6.3, 6.4 of the indirect outlet channels 7.3, 7.4 are in flow or fluid communication with the indirect outlet openings 26.1, 26.2 on the backside of the piston 22.

Figure 2:
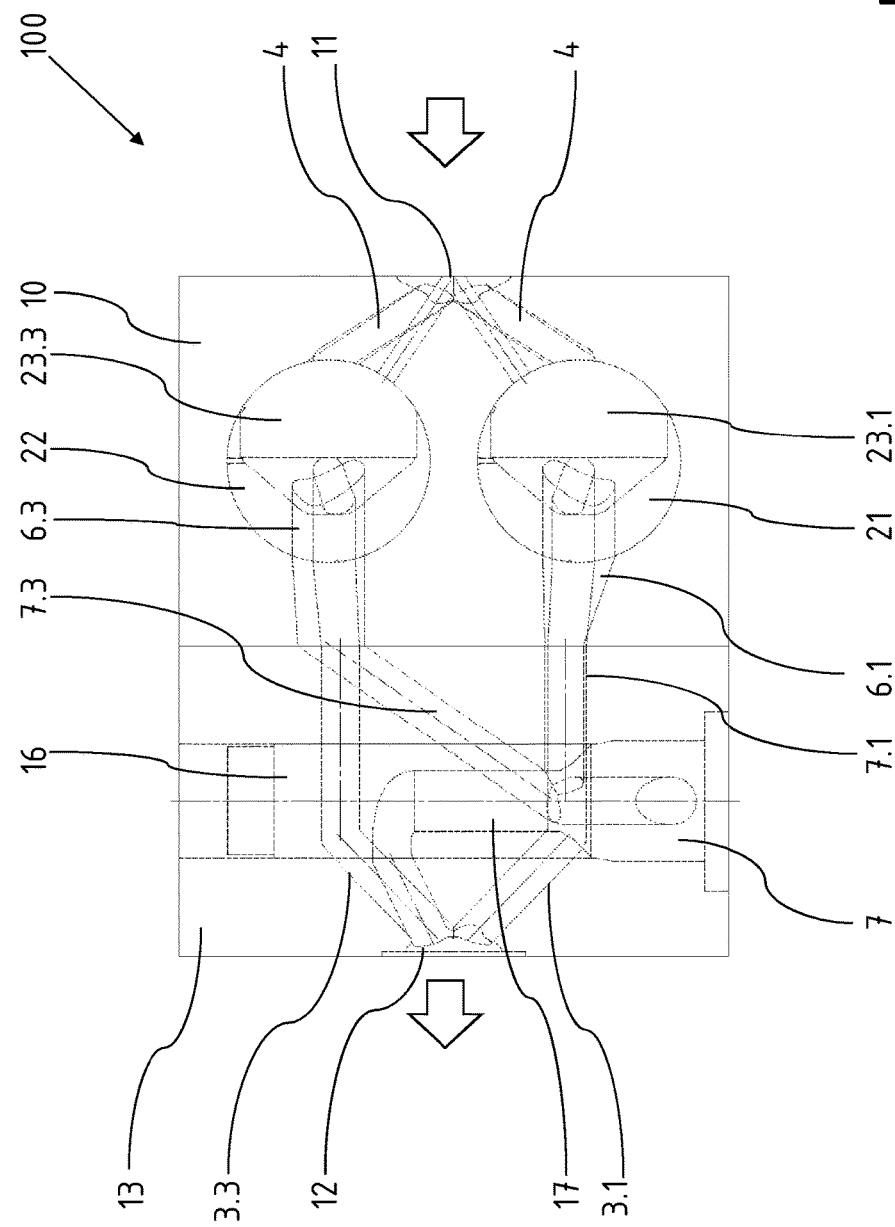
FIG. 2 illustrates the filtering device seen from the left side.

The channel system of the invention is shown in FIG. 2. On the right side there is the inlet opening 11. The partial inlet channels 4 connect the inlet opening 11 to the cavities 23.1, 23.3 inside the pistons 21, 22. From both pistons 21, 22 the indirect outlet channels 7.1, 7.3 extend towards a collective reservoir 7. The reservoir 7 is terminated on the lower side by a lid at the bottom of the supplementary housing 13 and on the upper side by the displacing piston 16, which is disposed in the collective reservoir 7.

Features of the filtering device 100 include the distinction between different groups of outlet channels and the shape, inclination and position of the openings of the outlet channels in the housing and the corresponding openings on the pistons.

Figure 3:
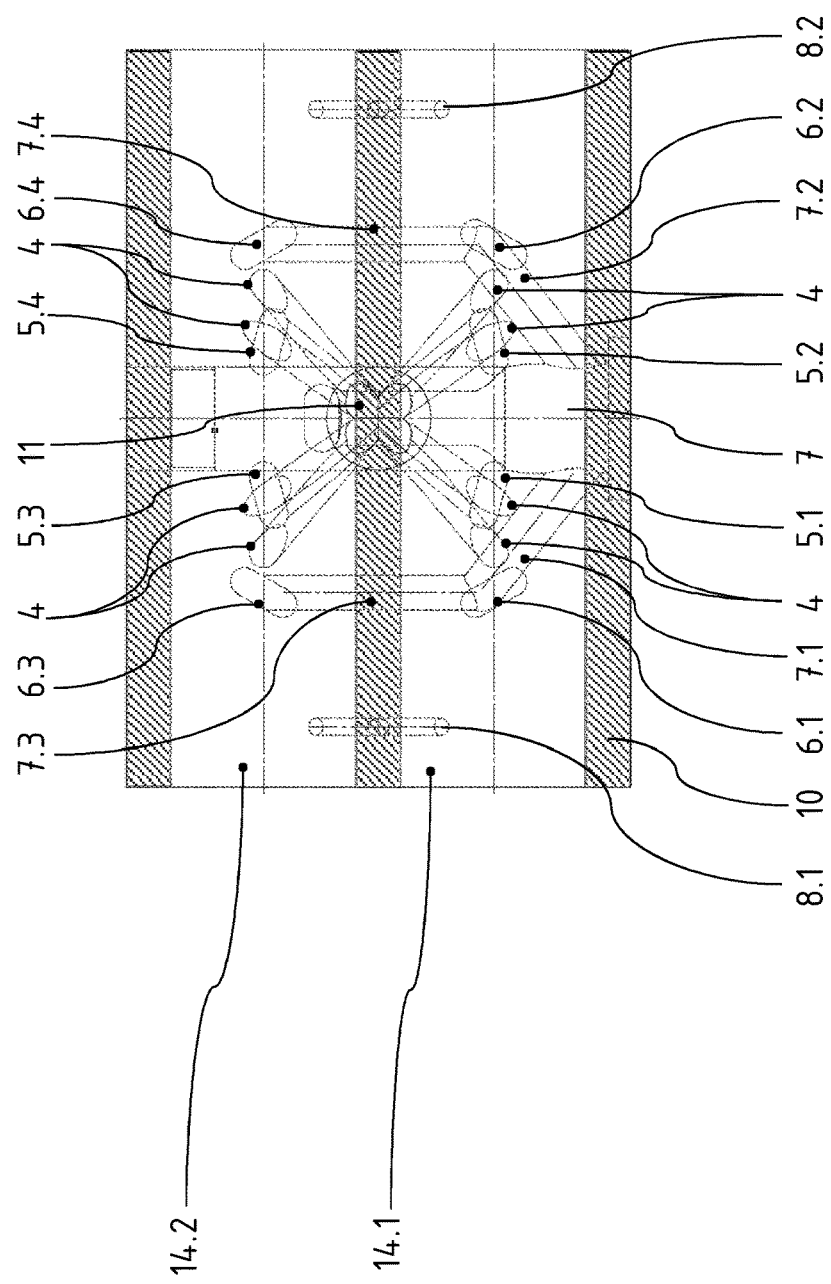
FIG. 3 illustrates a housing only in a vertical sectional view.

With reference made to FIG. 3 the shape, inclination and position of the openings is explained in further detail:

FIG. 3 shows the housing 10 without any pistons in a vertical sectional view. The sectional plane runs through the middle axes of the bores 14.1, 14.2 for the pistons 21, 22. The view is directed onto the inlet opening 11, from which different inlet partial channels 4 are extending and are opening out into the bores 14.1, 14.2.

For each cavity in the pistons there are two inlet channels 4 provided because a certain axial extension of an inlet zone is needed in order to bring the fluid to the screen in a number of axial positions of the piston and to achieve a uniform flow over the whole area of the screen. Instead of two separated openings one elongated hole could be provided to achieve the same hydraulic effect but two separated partial inlet channels 4 leading to separate openings are easier to manufacture by simply drilling the channels from the inlet opening 11.

In the rear, one can see the indirect outlet channels 7.1, 7.2, 7.3, 7.4, which lead to the collective reservoir 7. These channels 7.1 . . . 7.4 open into the bores 14.1, 14.2 at the outlet openings 6.1 . . . 6.4, of which one is related to each cavity.

As it can be seen in FIG. 3, the elongated openings 6.1 . . . 6.4 are neither extending in longitudinal direction of the bores 14.1, 14.2 nor perpendicular thereto but they are arranged in an oblique position with view to the middle axes of the respective bores 14.1, 14.2. The openings 6.1, 6.3 on the left side are arranged inversely to the openings on the right side 6.2, 6.4 such that they build a V-type arrangement. The reason for this arrangement is described in further detail with reference to FIG. 6 but first it has to be noted that the openings 5.1, 5.2, 5.3, 5.4 from which the direct outlet channels extend and are arranged in the slightly oblique matter.

Figure 4:
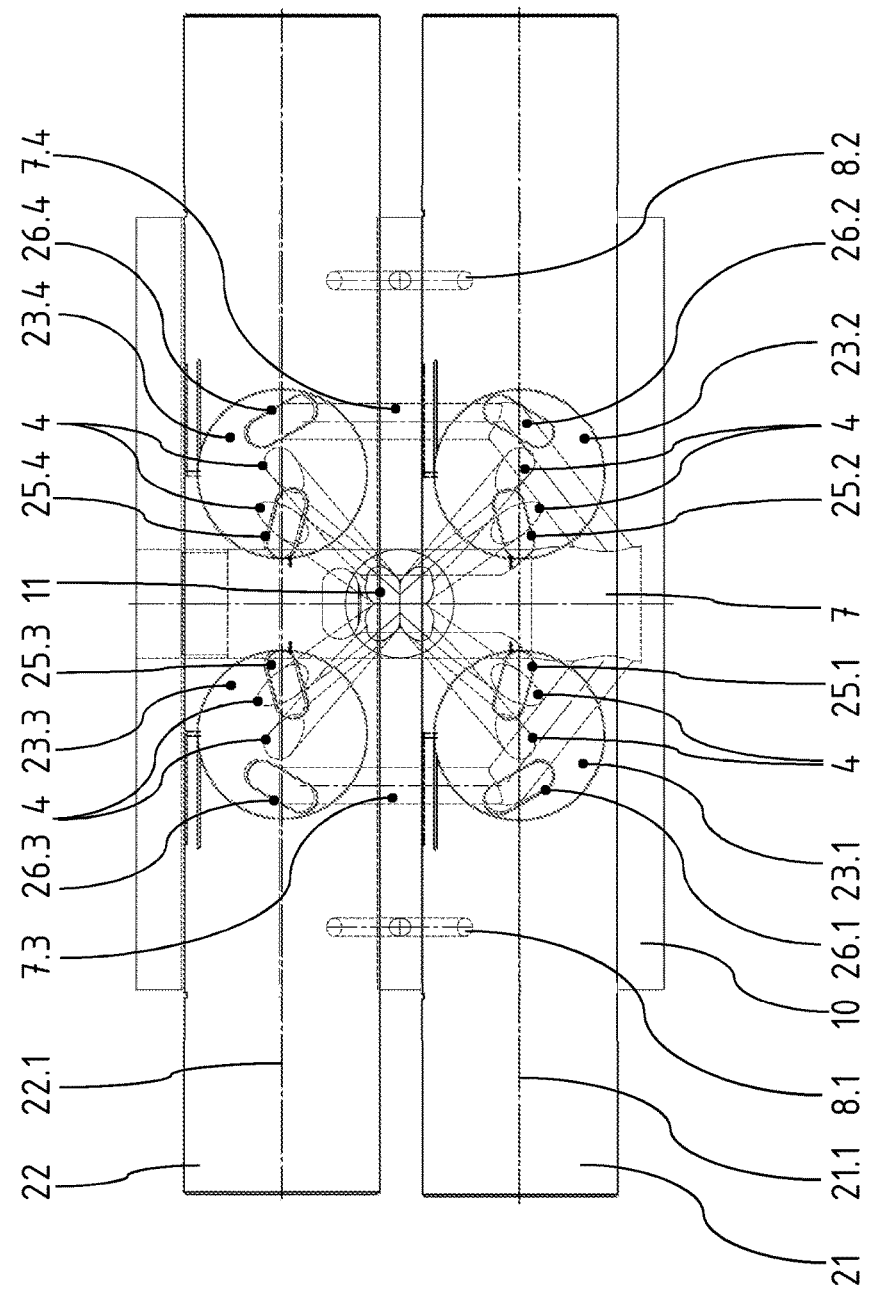
FIG. 4 illustrates the filtering device in the production mode in a vertical sectional view.

Referring now to FIG. 4, the filtering device 100 is shown in the same sectional view in a vertical sectional plane as in FIG. 3 but here with both pistons 21, 22 inserted. For the sake of clarity hashing are omitted.

The axial position of the pistons 21, 22 is such that all openings 6.1 . . . 6.4, 5.1 . . . 5.4 of the outlet channels match to the respective openings 25.1 . . . 25.4 and 26.1 . . . 26.4 on the pistons 21, 22. In the production mode, as illustrated in FIG. 4, each cavity is connected with two openings of partial inlet channels 4 and with one opening of a direct outlet channel as well as with one indirect outlet channel. The shape, position and inclination of the openings 25.1 . . . 25.4 and 26.1 . . . 26.4 on the piston is the same as of the openings of the channels 6.1 . . . 6.4, 7.1, 7.2 in the housing 10.

During the production mode, fluid enters into the housing at the inlet opening 11 and is split into the eight inlet partial channels 4, two for each cavity. Fluid flows into the cavity and through the screen positioned therein, which is not shown. Having passed the screen in the cavity, a part of the fluid runs to both the direct outlet channels 25.1 . . . 25.4 and to the indirect outlet channels 26.1 . . . 26.4. The portion of the fluid which runs through the direct outlet channel 25 . . . 25.4 is lead directly to the outlet opening 12. The portion of the fluid which leaves the cavity through the indirect outlet openings 26.1 . . . 26.4 runs through the indirect outlet channels 7.1 . . . 7.4 into the collective reservoir 7 in the lower part of the supplementary housing 13.

Figure 11A:
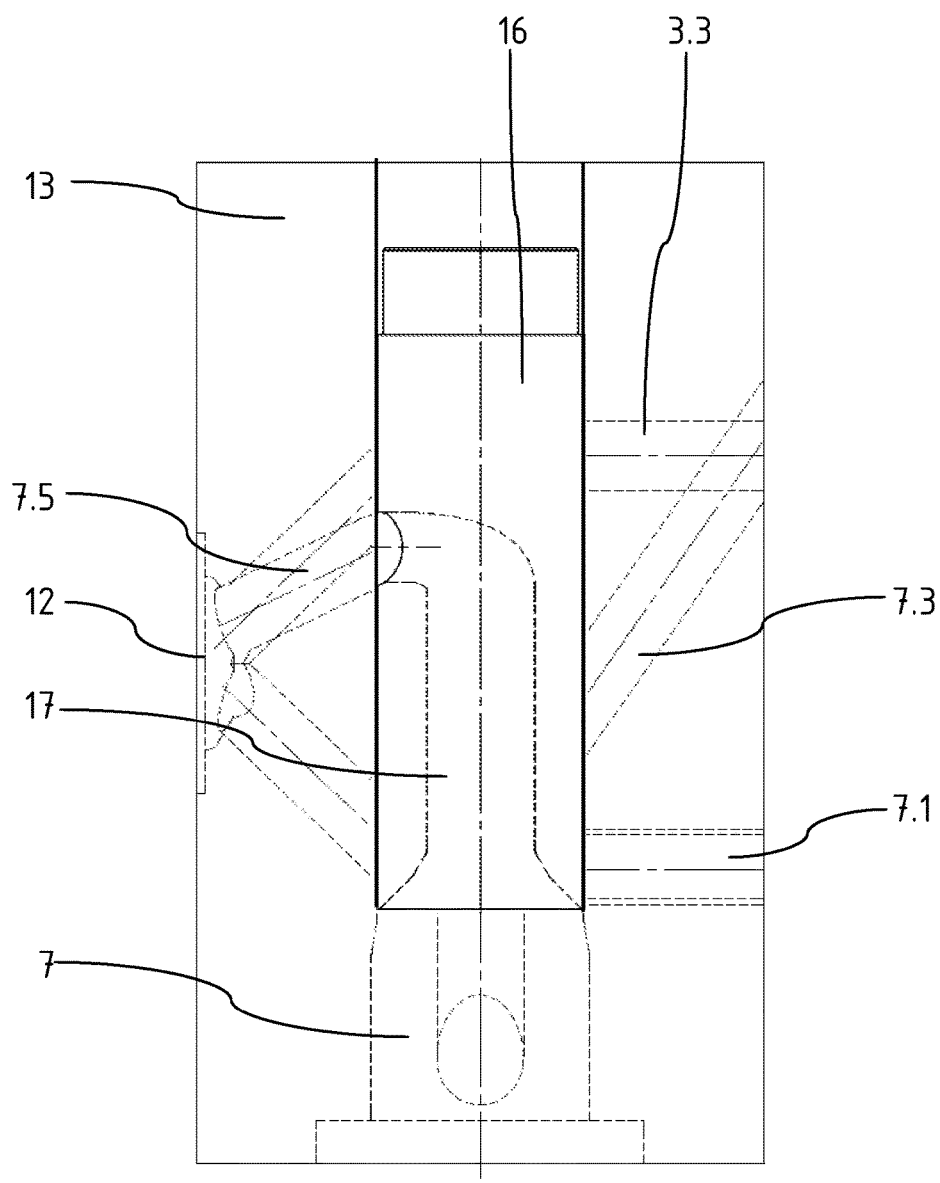
FIG. 11A, 11B illustrate the supplementary housing with the displacing piston in different positions, each seen in a sectional view from the left side.
Figure 11B:
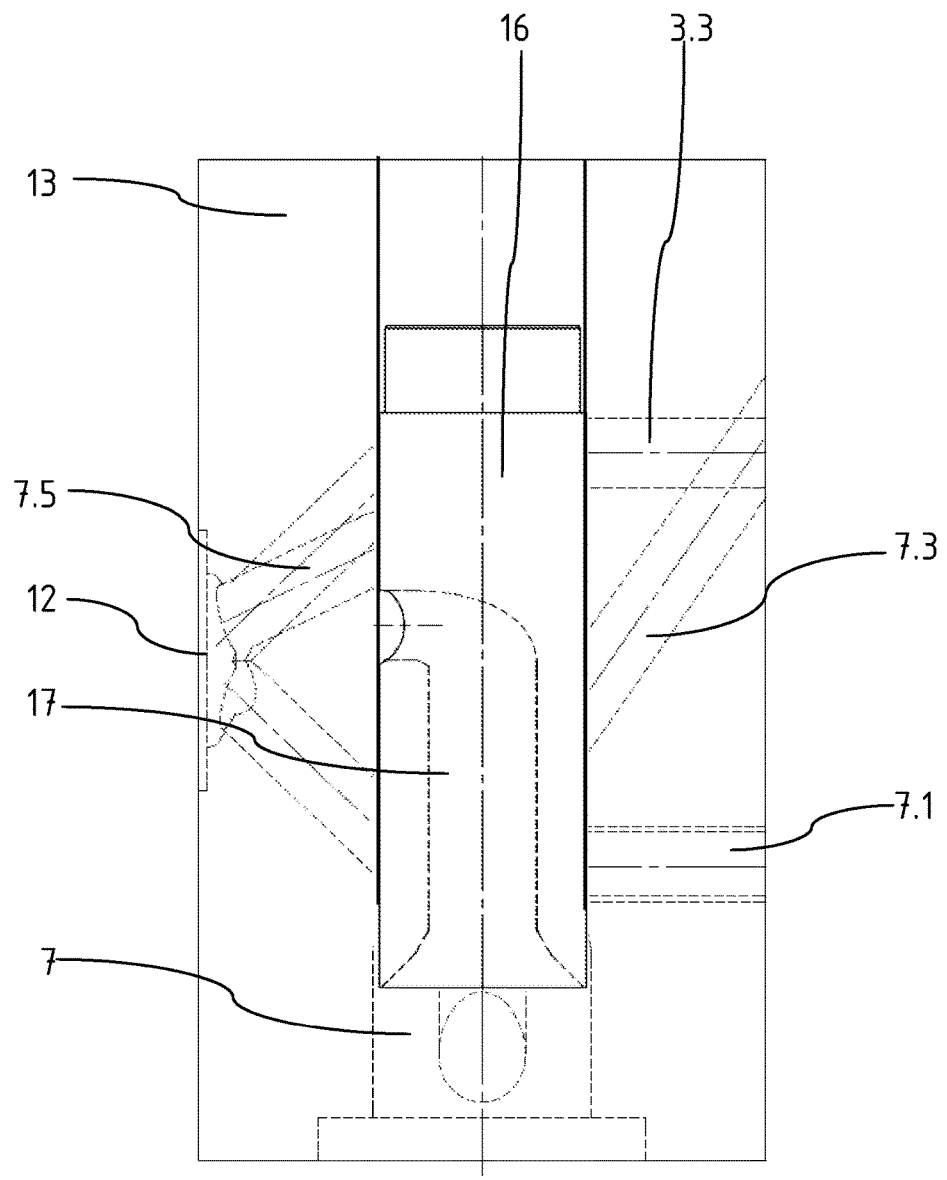

The displacing piston 16 is shown in enlarged form in FIGS. 11A and 11B. In the basic position according to FIG. 11A, the inner channel 17 opens into the reservoir 7 and matches with an outlet channel 7.5 leading directly to the outlet opening 12. In the production mode, fluid from the reservoir 7 flows through the displacing piston 16 to the outlet opening 12.

In the back-flushing mode, the displacing piston 16 moves forward in the reservoir 7, as illustrated in FIG. 11B, whereby two functions are achieved. First, the displacing piston 16 raises the pressure of the fluid in the reservoir 7 and the connected direct outlet channels 7.1 . . . 7.3 and pumps fluid towards the screen which must be cleaned. Second the displacing piston 16 serves as a valve and interrupts the connection between the reservoir 7 and the outlet opening 12.

Figure 5:
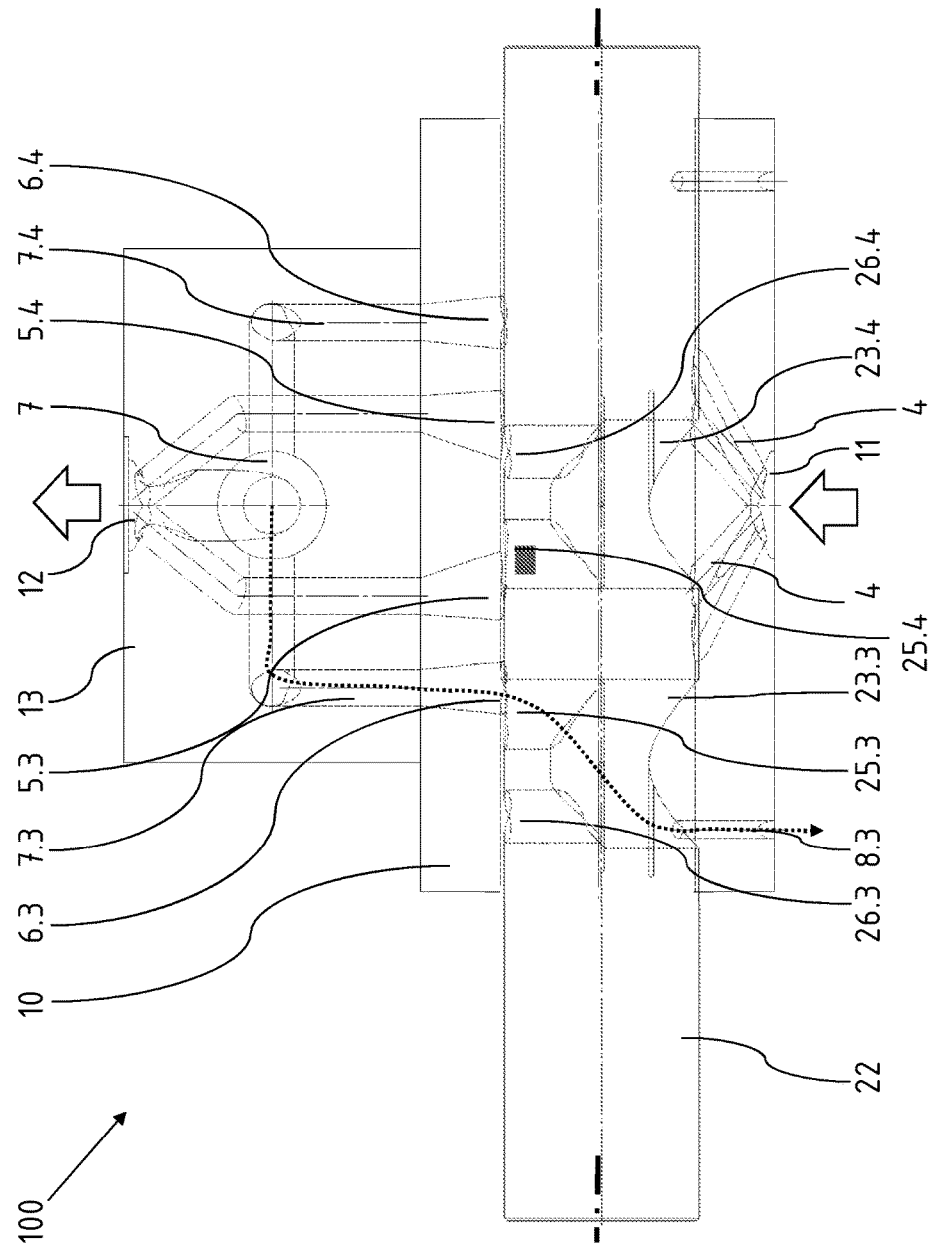
FIG. 5 illustrates the filtering device in back-flushing mode, in a horizontal sectional view through the plane of the upper piston.
Figure 6:
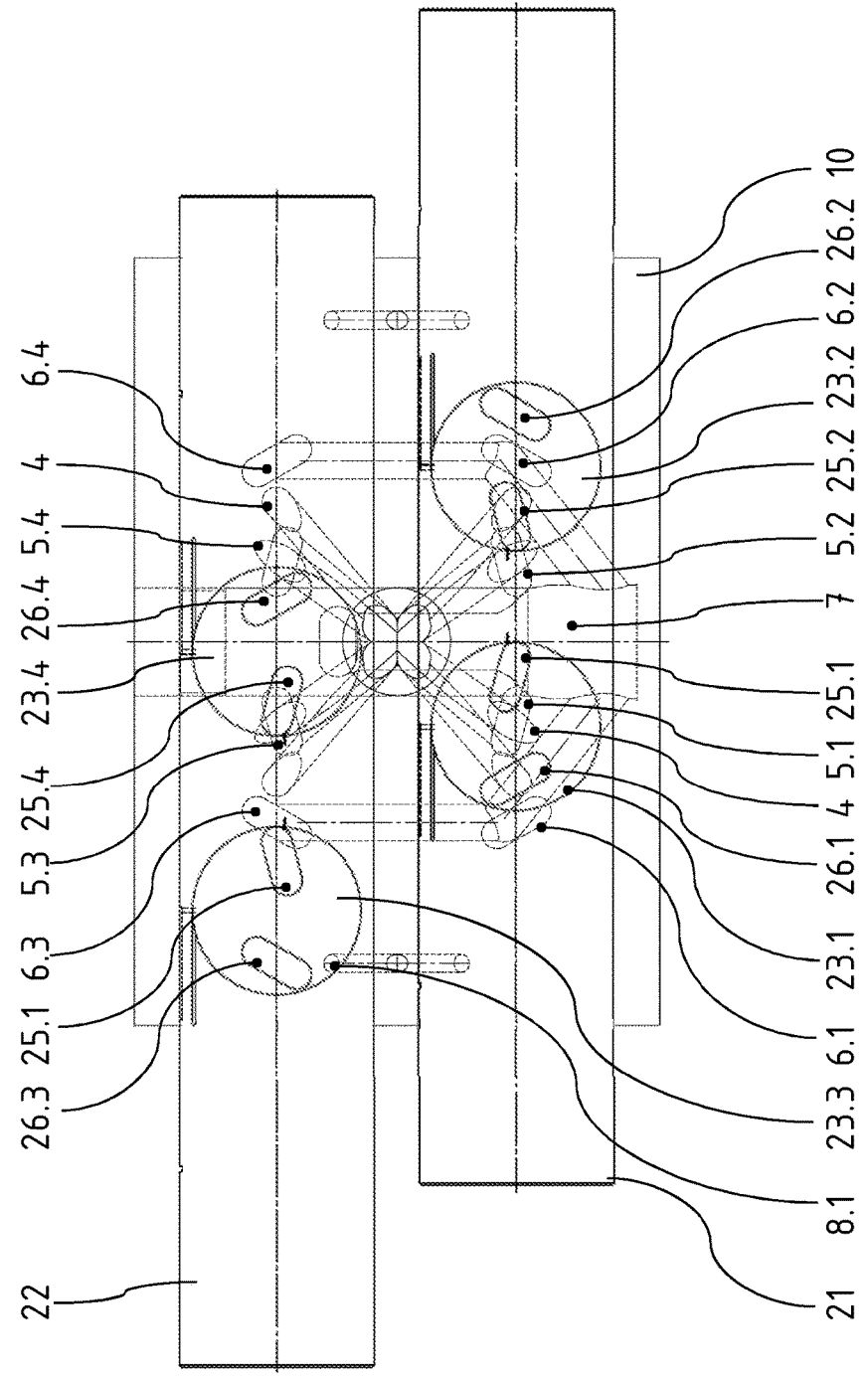
FIG. 6 illustrates the filtering device in back-flushing mode in a vertical sectional view.

The back flushing mode of the filtering device is shown in FIGS. 5 and 6 wherein the screen in the upper left cavity is to be cleaned.

FIG. 5 shows the filtering device in a horizontal sectional view again. In comparison to the production position in FIG. 1 to FIG. 4, the piston 22 has been moved to the left side. By this movement, the connection of the cavity 23.3 to the inlet channel 4 is interrupted as well as the flow through the opening 26.3 of the left cavity 23.3. However, there is a connection from the rear side between the indirect outlet opening 6.3 and the opening 25.3 on the piston 21. In addition, on the clean side of the cavity 23.3 there is a connection with the back flushing channel 8.3. In order to clean the screen, which is positioned in cavity 23.3, fluid is pumped from the reservoir 7 by the displacing piston 16 through the indirect outlet channel, 7.3 in a reverse flow direction through the outlet opening 6.3 into the outlet opening 25.3 and finally through the back flushing channel 8.3 to the outside of the housing 10. The flow path of the fluid opening used to clean the filter element or screen in the cavity 23.3 is depicted by the dotted line in FIG. 5.

Simultaneously, the filter element or screen in the cavity 23.4 remains in the production mode. Fluid is flowing through the filtering device 100 in the normal flow direction as illustrated by the large arrows in FIG. 5. The fluid enters the cavity 23.4 through two of the partial inlet channels 4 and flows through the screen and through the outlet openings 25.4 and 26.4. The fluid then enters into two different direct outlet openings 5.3, 5.4. However, there is no connection to the indirect outlet opening 6.4

In the filtering device 100 only one displacing piston 16 is needed as a pressure generator for back-flushing any of the four screens, the pressure generated inside the reservoir 7 expands to all branches of the indirect outlet channels 7.1, . . . , 7.4. Thus, pressure generated in the collective reservoir 7 is effective to the right side, too, but the opening 6.4 is closed by the piston 22 and the flow can only run through the left cavity 23.3 positioned in the back flushing mode.

As it can be seen in the side view in FIG. 2 again, there is a connection of the indirect outlet channel system to both levels in which each one of the pistons 21, 22 is positioned. When a screen in the upper piston 22 is to be back-flushed, the flow through the indirect outlet channels running through the other piston 21 has to be interrupted because at this time the flow through the indirect outlet channel 7.1, 7.3 goes in reverse flow direction.

In order not to adversely affect the production flow, which runs in the other direction, the lower piston 21 is moved slightly to the right side according to FIG. 5, thereby relocating the indirect outlet openings 26.1, 26.2 on the piston 21 apart from the indirect outlet openings 6.1, 6.2 in the housing 10. Regardless of what is happening in the system of the indirect outlet channels 7.1 . . . 7.4 at this stage there will be no adverse effect on the production neither in the second cavity 23.4 in the upper piston 22 nor in any of the cavities 23.1, 23.2 in the lower piston 21.

In FIG. 6 it can be seen that the openings 5.1, 5.2 relating to direct outlet channels 7.1 . . . 7.4 and to the openings 25.1, 25.2 on the piston 22 are partially overlapping. Also, a connection is formed between each cavity 23.1, 23.2 and at least one of the partial inlet channels 4 so that the flow in the production mode direction can still continue in three of the four cavities while one of the filter element or screen in the cavities is being cleaned.

The interruption of the flow through the indirect outlet channel openings 6.1, 6.2 and the corresponding openings 26.1, 26.2 on the piston is achieved by arranging these openings parallel to each other in their longitudinal extension and by positioning both of them in an oblique direction with view to the middle axis of the piston. So the position according to FIG. 6 represents a blocking mode which interrupts all connections to the collective reservoir that are not needed for the cleaning process on the respective other piston.

The enlarged detail of FIG. 6 in FIG. 10 shows that not only the opening 26.1 on the piston 21 and the corresponding indirect outlet channel opening 6.1 are arranged obliquely relative to the middle axis 21.1 but that also the opening 25.1 and the corresponding opening of the direct outlet channel 5.1 are arranged obliquely relative to the middle axis 21.1.

By arranging the other openings 5.1, 25.1 obliquely in a small angle of less than 30° relative to the middle axis 21.1 rather than letting them extend parallel along the middle axis 21.1 the opening 5.1 is turned away from the opening 26.1 in the blocking mode. So the opening 5.1 can extend longer than in an arrangement parallel to the axis 21.1 which is simulated in FIG. 10 by the dotted line.

By this arrangement of the openings 5.1, 6.1 in the housing and the opening 26.1 on the piston a movement of the piston 21 for a distance Δx causes a sufficient offset Δd of the edges of the opening 26.1 to both adjacent openings 6.1, 5.1 which is required for a reliable interruption of the flow of the fluid.

Regarding the back-flushing mode only the separation of the cavities 23.1, 23.2 from the indirect flow channels 7.1 . . . 7.4 could also be achieved by round openings or by elongated holes being arranged perpendicular to the middle axis. The reason to arrange these openings in an oblique direction is given below in the explanation of the filtering device in the screen changing mode.

Figure 7:
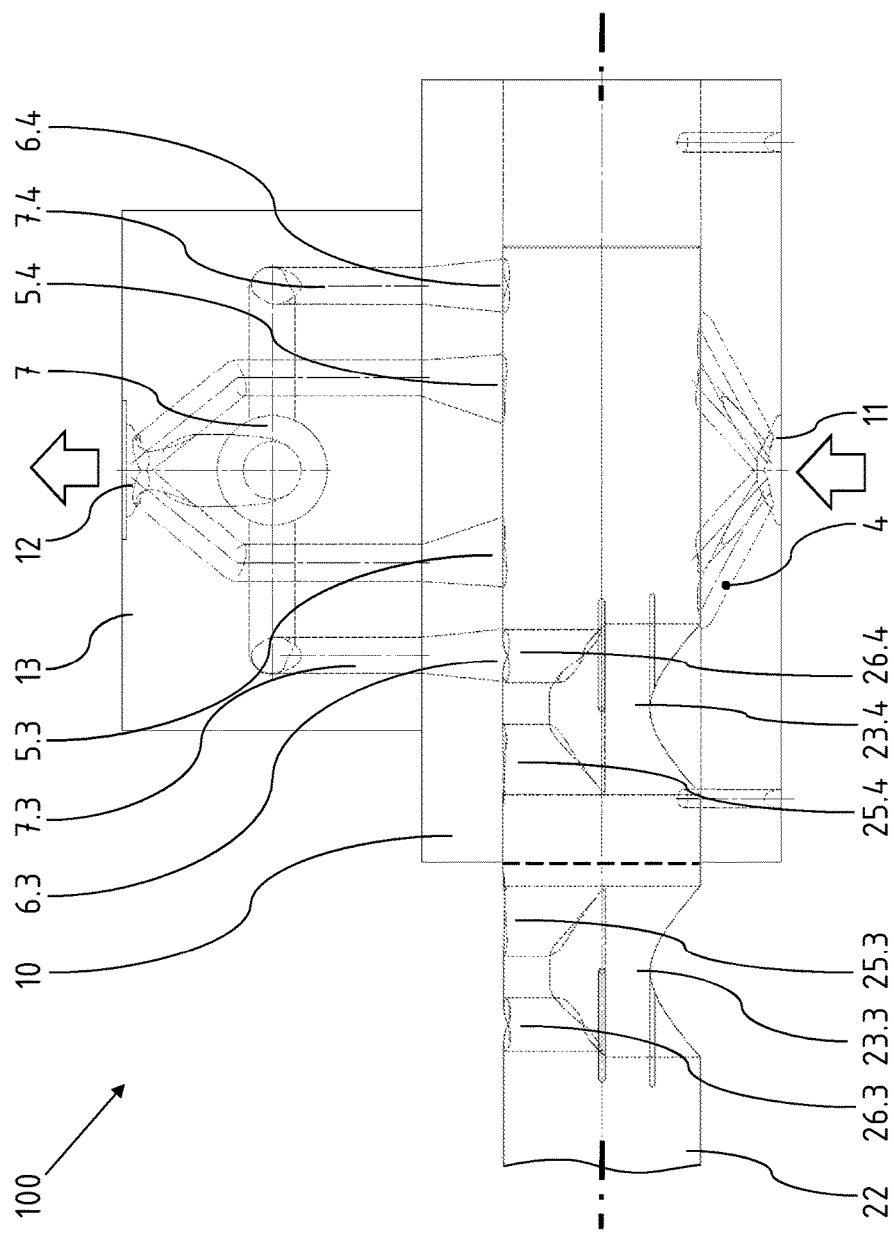
FIG. 7 illustrates the filtering device in screen changing mode, in a horizontal sectional view.
Figure 8:
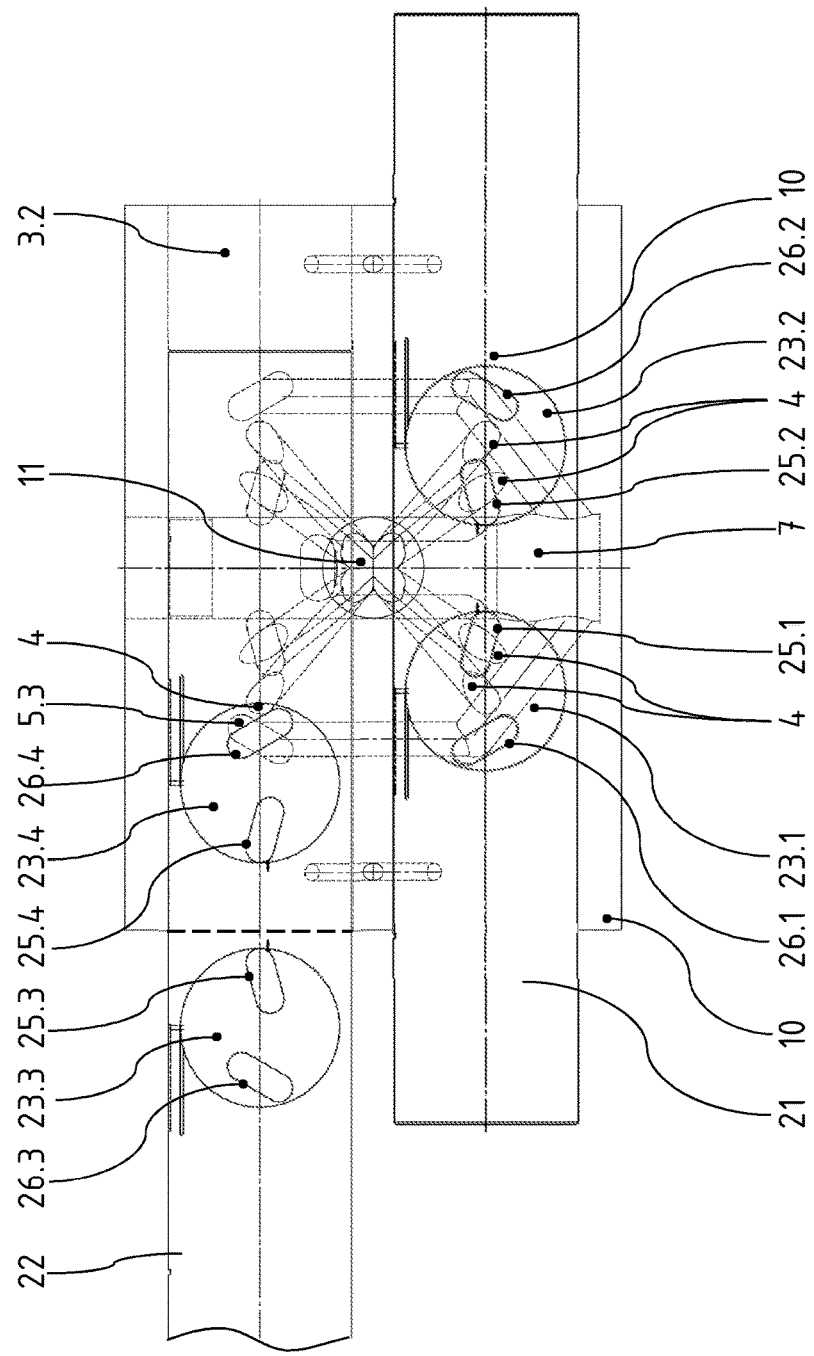
FIG. 8 illustrates the filtering device in screen changing mode, in a vertical sectional view.

The filtering device 100 can also be used in a screen changing mode if a screen cannot be cleaned further by back-flushing so it has to be replaced. FIGS. 7 and 8 show the filtering device 100 in a screen changing mode, which is entered from the production mode according to FIGS. 1 to 4 by moving only the upper piston 22 on which a screen has to be replaced. The other piston 21 remains in its original position as shown in FIGS. 1 to 4 without any relative movement of matching openings 25.3, 25.4 and 26.3, 26.4 on the piston 21 and corresponding openings 5.3, 5.4, 6.3, 6.4 in the housing 10.

In the screen changing mode no pressure is generated in the indirect outlet channel system. Accordingly, it is not necessary to move the other piston 21 to the blocking position as shown in FIG. 6 where both cavities 23.1, 23.2 are separated from the indirect outlet channels 7.1, 7.2 in the housing 10. In comparison with the position in the production mode, as shown in FIGS. 1 to 4, the piston 22 in FIG. 7 has been moved left so that the cavity 23.3 which has the screen which must be replaced, is moved out of the housing 10 and is freely accessible for an operator. At the other cavity 23.4 in the same piston 22 there is a connection both to the inlet channel 4 and to one outlet channel opening 6.3 which is part of the indirect outlet channel system. Consequently, production can be carried on through cavity 23.4 while maintenance work is performed on the screen in cavity 23.3.

FIG. 8 shows again in a vertical sectional view both pistons 21, 22. At the piston 21 all outlet channel openings 25.1, 25.2, 26.1, 26.2 completely cover their related openings of the direct and indirect outlet channels in the housing. Also two partial inlet channels 4 open out into each cavity 23.1, 23.2. The right cavity 23.4 on the upper piston 22 is still connected to the most left partial inlet channel 4.

Most important to be mentioned in this view are the position and the extension of the indirect outlet opening 26.4 on the upper piston's right cavity 23.4 compared to the shape, inclination and position of the indirect outlet opening 5.3 in the housing 10. The opening 26.4 and the opening 5.3 are each extending longitudinally wherein the axis is arranged obliquely with view to the middle axis. The respective angles of inclination of the opening 26.4 and the opening 5.3 are arranged inversely thus resulting in a V-Type or X-Type arrangement when they are overlapping. Rather than being arranged parallel and spaced apart like in the blocking mode of piston 21 in FIG. 6 the overlapping areas are achieved by this arrangement over quite a long axial distance thus maintaining the production mode for the right cavity 23.4 during screen changing works to be carried out on the other cavity. In the preferred embodiment of the invention, the flow through the remaining cavity is never interrupted while the piston is moved in order to carry out replacement operations of a screen in one cavity. Accordingly, 75% of the filter area always remains operational during replacement of the screen in one cavity. Thus, like in back-flushing mode, three of four screens are still used in screen changing mode.

The oblique arrangement of elongated openings on both the pistons 21, 22 and in the housing 10 is an feature of the filtering device 100 in the preferred embodiment of the invention comprising two pistons 21, 22 which carry two screens each because this arrangement makes it possible to maintain a flow through one cavity on the piston during the whole movement from production mode position to screen changing position. This is further illustrated by FIGS. 9A to 9C, which each show an intermediate position in which the upper piston 22 has been already moved for a certain distance to the left.

The openings 6.1, . . . , 6.4 of the indirect outlet channels 7.1 . . . 7.4 and the related openings 26.1 . . . 26.4 on the pistons 21, 22 are arranged obliquely with an angle of more than 45° relative to the middle axis 21.1, 22.2 of the pistons 21, 22. The openings 5.1, . . . , 5.4 of the direct outlet channels 5.1 . . . 5.4 and the related openings 25.1 . . . 25.4 from the cavities 23.1, 23.2, 23.3, 23.4 on the pistons 21, 22 are arranged obliquely with an angle of less than 45° in the same orientation as the openings 6.1, . . . , 6.4 of the indirect outlet channels 7.1 . . . 7.4 and the related openings 26.1 . . . 26.4.

In FIG. 9A, the left cavity 23.3 has already been separated from all openings in the housing 10 related to the production mode. The right cavity 23.4 is still connected to one inlet channel 4 and to a direct outlet channel opening 5.3 via opening 25.4.

In FIG. 9B, the piston 21 has been moved further but has not completely been moved out of the housing 10. On the inlet side the right cavity 23.4 is connected to two inlet channels 4 and on the outlet side there are overlapping areas both of opening 26.4 and housing opening 5.3 and of opening 25.4 and opening 6.3. There is also an overlapping area at opening 25.4 and opening 5.3.

By further movement of the piston 22 to the left, a further intermediate position is entered, which is shown in FIG. 9C. In this position, opening 25.4 has no more connection to opening 6.3 but still there are overlapping areas at both outlet openings 25.4, 26.4 with housing openings 5.3, 6.3. There is no position on the way to the screen changing position, in which the flow through right cavity 23.4 is totally interrupted. Pressure surges in the filtering device 100 are thereby avoided.

Of course, it is well understood that due to the symmetrical arrangement of all openings at all cavities 23.1, . . . , 23.4 on both pistons 21, 22 as well as of the openings in the housing the back-flushing and screen changing operations described above can also be carried out on the respective right cavity 23.4 by a right movement of the piston 22 as well as on both cavities 23.1, 23.2 on the lower piston 21. The arrangement of all openings and openings on the left is repeated as a mirror image on the right and the arrangement of all openings and openings on the lower piston is repeated as a mirror image on the upper piston. Only the rims needed for venting and filling the cavities have to be arranged on the upper side of each piston.

What is claimed is:

1. A filtering device for high-viscous fluids, the filtering device having a production mode and a back-flush mode, and comprising:
   a housing having bores;
   two pistons being movably disposed in the bores, each piston having at least one cavity, at least one filter element positioned within each cavity;
   an inlet opening in the housing and at least two partial inlet channels connected to the inlet opening;
   at least one back-flushing channel capable of being connected to either of the cavities;
   an outlet channel connecting, in the production mode, from an outlet opening at each cavity to an outlet opening at the housing; and
   a displacing piston for generating fluid pressure and reversing the flow direction at the fluid during the back-flushing mode in an outlet channel or in a reservoir connected therewith,
   wherein the connection between the outlet channel and the outlet opening or between the reservoir and the outlet opening, respectively, is interruptible via the displacing piston or via a valve,
   wherein a common displacing piston is provided for back-flushing the filter element in any of the cavities, each cavity having at least two outlet openings,
   wherein one of the outlet openings is capable of being connected to a direct outlet channel which is directly connected with the outlet opening of the device, and one of the outlet openings is capable of being connected to an indirect outlet channel,
   wherein the indirect outlet channels open into a common reservoir in which the displacing piston is movably disposed, and
   wherein the positions of the outlet openings from each cavity and the outlet channel openings in the housing as well as of the inlet channels and back-flushing channels are arranged such that:
      in production mode, at each cavity, at least one outlet opening is overlapping at least partially with one direct outlet opening and at least one additional outlet opening is overlapping at least partially with an indirect outlet opening, and
      in the back-flushing mode, the indirect outlet channel is connected to at least one outlet opening of the cavity which is to be back-flushed.

2. The filtering device of claim 1, wherein the positions of the outlet openings from the cavities and the outlet channel openings in the housing as well as of the inlet channels and back-flushing channels are arranged spaced apart to each other along the longitudinal axis of the respective piston.

3. The filtering device according to claim 1, wherein each piston has two cavities.

4. The filtering device according to claim 1, wherein the openings of the indirect outlet channels and the related openings on the pistons are arranged obliquely relative to the middle axis of the pistons.

5. The filtering device of claim 4, wherein the openings of the direct outlet channels and the related openings from the cavities on the pistons are arranged obliquely in the same orientation as the openings of the indirect outlet channels and the related openings.

6. A filtering device for high-viscous fluids, the filtering device having a production mode and a back-flush mode, and comprising:
   a housing having bores;
   two pistons being movably disposed in the bores, each piston having at least one cavity, at least one filter element positioned within each cavity;
   an inlet opening in the housing and at least two partial inlet channels connected to the inlet opening;
   at least one back-flushing channel capable of being connected to either of the cavities;
   an outlet channel connecting, in the production mode, from an outlet opening at each cavity to an outlet opening at the housing; and
   a displacing piston for generating fluid pressure and reversing the flow direction at the fluid during the back-flushing mode in an outlet channel or in a reservoir connected therewith,
   wherein the connection between the outlet channel and the outlet opening or between the reservoir and the outlet opening, respectively, is interruptible via the displacing piston or via a valve,
   wherein a common displacing piston is provided for back-flushing the filter element in any of the cavities, each cavity having at least two outlet openings,
   wherein one of the outlet openings is capable of being connected to a direct outlet channel which is directly connected with the outlet opening of the device, and one of the outlet openings is capable of being connected to an indirect outlet channel,
   wherein the indirect outlet channels open into a common reservoir in which the displacing piston is movably disposed,
   wherein the positions of the outlet openings from each cavity and the outlet channel openings in the housing as well as of the inlet channels and back-flushing channels are arranged such that:
      in production mode, at each cavity, at least one outlet opening is overlapping at least partially with one direct outlet opening and at least one additional outlet opening is overlapping at least partially with an indirect outlet opening, and
      in the back-flushing mode, the indirect outlet channel is connected to at least one outlet opening of the cavity which is to be back-flushed, and
   wherein, during the back-flushing mode, by the axial movement of one piston, the indirect outlet channel is connected to at least one outlet opening of the cavity containing the filter element which is to be back-flushed.

7. A filtering device for high-viscous fluids, the filtering device having a production mode and a back-flush mode, and comprising:
   a housing having bores;
   two pistons being movably disposed in the bores, each piston having at least one cavity, at least one filter element positioned within each cavity;
   an inlet opening in the housing and at least two partial inlet channels connected to the inlet opening;
   at least one back-flushing channel capable of being connected to either of the cavities;
   an outlet channel connecting, in the production mode, from an outlet opening at each cavity to an outlet opening at the housing; and a displacing piston for generating fluid pressure and reversing the flow direction at the fluid during the back-flushing mode in an outlet channel or in a reservoir connected therewith, wherein the connection between the outlet channel and the outlet opening or between the reservoir and the outlet opening, respectively, is interruptible via the displacing piston or via a valve, wherein a common displacing piston is provided for back-flushing the filter element in any of the cavities, each cavity having at least two outlet openings, wherein one of the outlet openings is capable of being connected to a direct outlet channel which is directly connected with the outlet opening of the device, and one of the outlet openings is capable of being connected to an indirect outlet channel, wherein the indirect outlet channels open into a common reservoir in which the displacing piston is movably disposed, wherein the positions of the outlet openings from each cavity and the outlet channel openings in the housing as well as of the inlet channels and back-flushing channels are arranged such that:

in production mode, at each cavity, at least one outlet opening is overlapping at least partially with one direct outlet opening and at least one additional outlet opening is overlapping at least partially with an indirect outlet opening, and in the back-flushing mode, the indirect outlet channel is connected to at least one outlet opening of the cavity which is to be back-flushed, and wherein, in the back-flushing mode, all cavities on the other piston are disconnected from the indirect outlet channels by the axial movement of the respective other piston.

8. The filtering device according to claim 6, wherein the openings of the indirect outlet channels and the related openings on the pistons are arranged obliquely relative to the middle axis of the pistons.

9. The filtering device of claim 8, wherein the openings of the direct outlet channels and the related openings from the cavities on the pistons are arranged obliquely in the same orientation as the openings of the indirect outlet channels and the related openings.

* * * * *